(No Model.)
W. G. WOOD.
PROCESS OF MANUFACTURING GAS.
No. 454,925. Patented June 30, 1891.
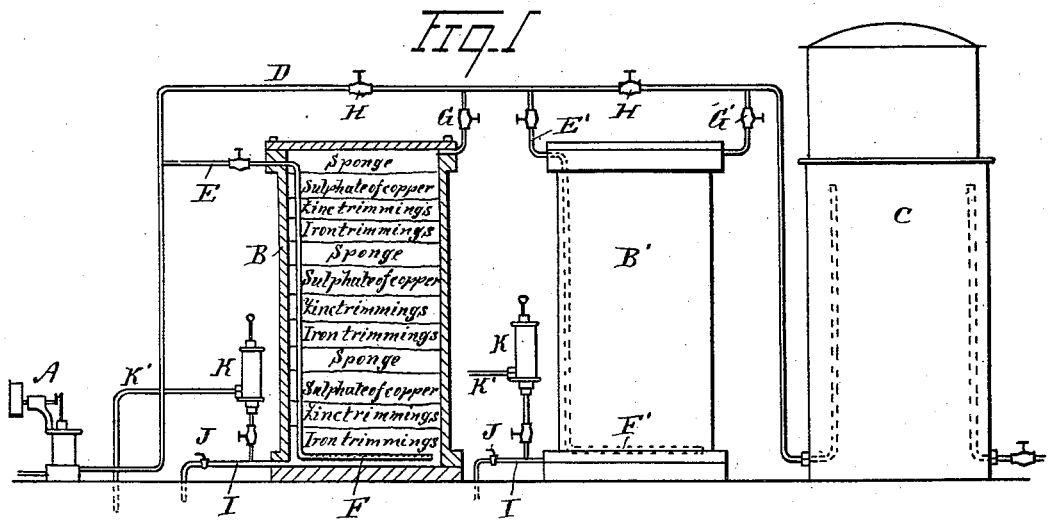
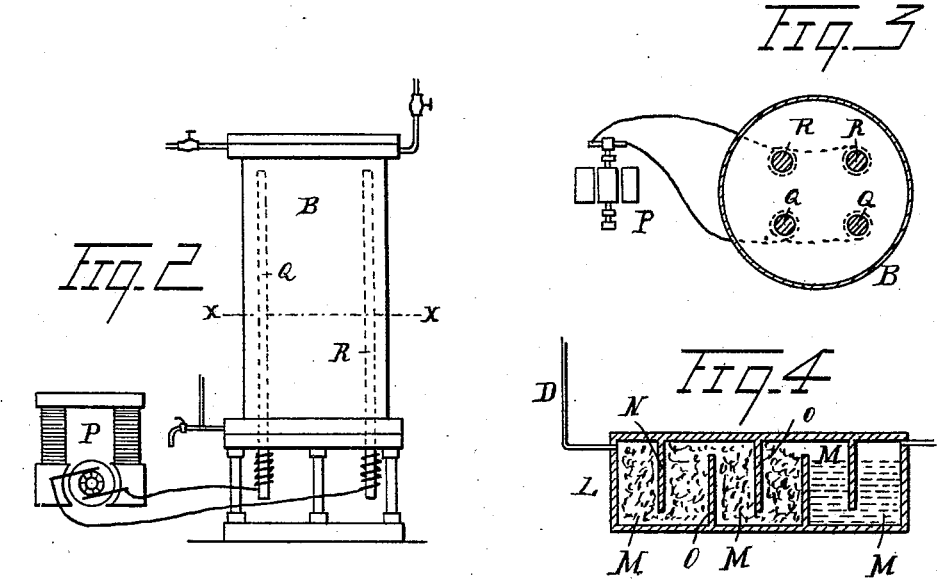
Witnesses
John Schuman.
John McArdle
Inventor
William G. Wood,
By his Attorney
Edmund J. Scully.

UNITED STATES PATENT OFFICE.

WILLIAM G. WOOD, OF WINDSOR, CANADA, ASSIGNOR OF THREE-FOURTHS TO THOMAS A. BOURKE, JOHN A. SMITH, CHARLES H. DELISLE, AND JOHN McARDLE, ALL OF SAME PLACE; CHARLES F. CONRAD ADMINISTRATOR OF SAID WOOD, DECEASED.

PROCESS OF MANUFACTURING GAS.

SPECIFICATION forming part of Letters Patent No. 454,925, dated June 30, 1891.

Application filed May 25, 1889. Serial No. 312,036. (No model.) Patented in Canada May 15, 1889, No. 31,363, and in England June 24, 1889, No. 10,256.

*To all whom it may concern:*

Be it known that I, WILLIAM GOODWIN WOOD, a citizen of the United States, residing at Windsor, in the Province of Ontario, Dominion of Canada, have invented certain new and useful Improvements in the Art or Process of Manufacturing Gas, (for which a patent has been granted to me in Canada, No. 31,363, dated May 15, 1889, and also in the Kingdom of Great Britain, dated June 24, 1889, and numbered 10,256;) and I do hereby declare that the following is a full, clear, and exact description of the invention, which will enable others skilled in the art to which it appertains to make and use the same.

My improvement relates to that class of gas-making processes in which air and hydrogen are passed through hydrocarbon; and the invention consists in the process hereinafter described and then definitely claimed.

Figure 1 is an elevation, partially in section, showing the general arrangement of a plant for producing gas by my process. Fig. 2 is an elevation showing the generator as modified to apply electricity. Fig. 3 is horizontal section on the line $x$ $x$ in Fig. 2, and Fig. 4 is a vertical central section through the carburetor.

A is an air-pump or blower driven by suitable power.

B B' are the gas-generators, and C is a gas-holder of any suitable description. A pipe D leads from the pump to the generators and is connected therewith by means of the branch pipes E and E', which enter near the top of the generators and extending downwardly terminate in a perforated portion F F' at or near the bottom thereof. The top of the generator is connected with the pipe D by means of the branch connections G and G'. Each of these branch connections is valved and valves H are placed in the main pipe D.

The generators are preferably cylindrical in form, constructed of any suitable material, preferably with a detachable head or suitable man-holes, and are filled inside with alternate layers of iron filings, zinc turnings, sulphate of copper, and sponge. The sponge before being used is thoroughly freed from all animal matter by washing it in a suitable solution and then drying it, and the sulphate of copper is preferably introduced in the form in which it is placed upon the market. Into the bottom of the generator enters a pipe I, which is provided with a waste-valve J and a valve connection with a hand-pump K or other equivalent device for injecting the liquid charge into the generator.

In practice, the apparatus being constructed and arranged as described, gas is generated in the following manner: By closing the waste-valve J and opening the valve between the pump K and the generator sulphuric acid of suitable strength is forced into the generator to a certain height above its bottom, the acid being supplied to the pump through the suction-pipe K' from a suitable reservoir. Before or after introducing the acid some crude oil, naptha, or other similar liquid hydrocarbon is introduced in the same manner by the use of the pump K or otherwise. The connection between the pump K and generator being then closed, the valves in the branch pipes E and E' and G and G' are opened and the valves H H closed. The air-pump is then set in motion, whereby the air is forced through the pipe E into the generator B, issuing in small jets through the perforated portion F in said pipe. This causes an ebullition of the liquid in the generator and brings the acid in intimate contact with the materials contained in the generator, as described. Chemical action will therefore take place between the acid and the zinc and iron, which results in the generation of hydrogen gas, which mixes with the air and rises to the top of the generator and passes through the pipe G into the pipe D, and from there is conducted to the pipe E' into the second generator, in which the same process takes place as in the first generator, and from this the gas finds its way through the pipe G' back into the main pipe D, which conducts it to the gas-holder. At the same time with the production of hydrogen gas the air which is introduced by the pump A escapes through the perforated pipe F into the first generator, and there, in addition to causing the mechanical action of ebullition, which assists in the generation of large masses of hydrogen gas, becomes charged with the volatile portions of the liquid hydrocarbon in the generator and, mingling with the hydrogen, passes into the second generator, where it is still further carbureted and finally enters the gas-holder mixed with the hydrogen. In bringing the hydrogen gas in its nascent state—that is, at the very instant at which it is generated—in contact with the carbureted air some hydrogen gas will unite with the hydrocarbon gases and form a gas which in mixing with the carbureted air and uncombined hydrogen forms a gas much superior in heating quality to the ordinary gas obtained from coal or by carbureting air.

The illuminating quality of the gas obtained depends entirely upon the amount of carbureted air contained in the mixture, and this can be varied to any desired degree by increasing or decreasing the quantity of air and liquid hydrocarbons introduced into the generator. Should it, however, be desired to make fuel-gas and illuminating-gas with the same charge in the generator, then it may be found preferable to charge the generator or generators in a suitable manner to produce fuel-gas—that is, gas with a less quantity of carbureted air—and then pass the gas before storing it in the holder through a suitable carbureting device, such as shown in Fig. 4. This carburetor consists of a box L, divided into a number of compartments M by means of partitions N and O, which alternately leave a space at the bottom or top. Some of the compartments are filled with charcoal saturated with crude oil or other suitable liquid hydrocarbons, and one or more are reserved for containing water or other washing-fluids, such as soapsuds. From this carbureter the gas is then conducted into the gas-holder in the usual manner, and will be found then to be endowed with the highest illuminating quality. If the material becomes spent in the generators, the valve J in the pipe I may be opened and the contents allowed to waste, and then new liquid may be introduced, as before described.

The sponge introduced into the generators has an important mechanical action in that it brings the materials into intimate contact with each other by its porous nature, which allows a small amount of acid to act throughout the whole generator, and the air, in addition to increasing the output of gas, acts also in a mechanical way to accelerate the generation of hydrogen gas.

The iron turnings and sulphate of copper form an important element in the generation. Small particles of the sulphate of copper by the violent action in the generator are brought into contact with the iron filings, and these, in addition to being capable of setting free the hydrogen gas under the action of the sulphuric acid, act chemically on the sulphate of copper by producing metallic copper, which forms, in combination with the zinc turnings and the acid in the generator, a galvanic battery, producing a local electric current through the whole contents of the generator, and this electrical action, as is well known, has the peculiar effect of stimulating the chemical actions and of eliminating or precipitating some obnoxious matters, notably sulphur, contained in the crude petroleum, furnishing thereby a gas free from all sulphureted hydrogen.

It is well known that the generation of hydrogen gas for fuel-gas, while it is the best gas obtainable, is too costly to produce; but in generating it jointly and mixing it intimately with carbureted air I produce a gas equally desirable, a great deal cheaper, and having none of the disadvantages of hydrogen, such as its lack of illuminating quality and its small specific gravity.

A further addition to my mode of generating gas, which may or may not be used, is represented in Fig. 2, in which P shows a dynamo or other generator of electricity, and Q and R are copper or zinc rods extending through the contents of the generator from top to bottom, or nearly so, and projecting out through the base, the generator being supported, preferably, on columns. These copper and zinc rods are respectively connected with the generator to form the poles thereof, as shown in Fig. 3. Now it will be seen that if the dynamo is set in motion the rods Q and R become, respectively, anodes and cathodes, and, provided a suitable current is applied, electrolysis will take place—that is, the metal salts contained in the generator will be reduced just as in the process of electroplating. Thus by the application of electricity I can produce metallic zinc again by reducing it from its salt, into which it has been converted by the action of the sulphuric acid in generating hydrogen. The rods Q and R are made, preferably, of zinc and copper, so as to produce a galvanic current in the generator by forming the elements of a battery in connection with the acid in the generator. The electric current from the dynamo need be applied only at intervals.

It is obvious that one generator alone will form a complete plant or apparatus; but I preferably use two or more combined, as shown, for the purpose of making the manufacture of gas continuous, as it will be seen that either generator may then be disconnected and recharged while the other generator is in operation, and thus the gas making can be carried on continuously. Instead of connecting the generators in series, each may be independently connected with the gas-holder.

What I claim as my invention, and desire to secure by Letters Patent, is—

The herein-described method of manufacturing fuel or illuminating gas, consisting in generating hydrogen gas and carbureted air in intimate contact with each other in the same generator and under the constant influence of a galvanic current produced in the generator itself, and an exterior current intermittently applied to produce electrolysis, substantially as described.

WILLIAM G. WOOD.

Witnesses:
W. M. READE,
E. I. SCULLY.